US011976165B2

(12) United States Patent
Hofmann et al.

(10) Patent No.: US 11,976,165 B2
(45) Date of Patent: May 7, 2024

(54) METHOD FOR PRODUCING DOUBLE METAL CYANIDE CATALYSTS

(71) Applicant: Covestro Deutschland AG, Leverkusen (DE)

(72) Inventors: Joerg Hofmann, Krefeld (DE); Klaus Lorenz, Dormagen (DE); Elisabeth Vogelsang, Cologne (DE); Maria Gleixner, Kempen (DE)

(73) Assignee: Covestro Deutschland AG, Leverkusen (DE)

( * ) Notice: Subject to any disclaimer, the term of this patent is extended or adjusted under 35 U.S.C. 154(b) by 152 days.

(21) Appl. No.: 17/791,287

(22) PCT Filed: Jan. 11, 2021

(86) PCT No.: PCT/EP2021/050404
§ 371 (c)(1),
(2) Date: Jul. 7, 2022

(87) PCT Pub. No.: WO2021/148272
PCT Pub. Date: Jul. 29, 2021

(65) Prior Publication Data
US 2023/0038100 A1    Feb. 9, 2023

(30) Foreign Application Priority Data

Jan. 21, 2020 (EP) .................... 20152862

(51) Int. Cl.
*B01J 27/26* (2006.01)
*B01J 37/00* (2006.01)
*C01C 3/00* (2006.01)
*C08G 65/26* (2006.01)

(52) U.S. Cl.
CPC .......... *C08G 65/2663* (2013.01); *B01J 27/26* (2013.01); *B01J 37/0009* (2013.01); *C01C 3/002* (2013.01); *B01J 2208/00017* (2013.01)

(58) Field of Classification Search
CPC ....... C01C 3/002; B01J 37/0009; B01J 27/26; B01J 2208/00017; B01J 2531/26; B01J 2531/845; B01J 31/0205; B01J 31/069; B01J 31/2208; B01J 31/0202; C08G 65/2663
USPC ....... 502/150, 152, 153, 155, 156, 159, 160, 502/162, 167, 172, 175
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Johnston | |
| 3,941,849 A | 3/1976 | Herold | |
| 5,099,075 A | 3/1992 | Katz et al. | |
| 5,158,922 A | 10/1992 | Hinney et al. | |
| 5,470,813 A | 11/1995 | Le-Khac | |
| 5,482,908 A | 1/1996 | Le-Khac | |
| 5,545,601 A | 8/1996 | Le-Khac | |
| 5,627,120 A | 5/1997 | Le-Khac | |
| 5,712,216 A | 1/1998 | Le-Khac et al. | |
| 5,714,428 A | 2/1998 | Le-Khac | |
| 6,063,897 A | 5/2000 | Le-Khac et al. | |
| 6,835,687 B2 | 12/2004 | Hofmann et al. | |
| 7,008,900 B1 | 3/2006 | Hofmann et al. | |

FOREIGN PATENT DOCUMENTS

WO    0139883 A1    6/2001

OTHER PUBLICATIONS

International Search Report, PCT/EP2021/050404, date of mailing: Apr. 1, 2021, Authorized officer: Daphne Klaes.

*Primary Examiner* — Elizabeth D Wood
(74) *Attorney, Agent, or Firm* — Donald R. Palladino

(57) ABSTRACT

The present invention relates to a method for producing a double metal cyanide (DMC) catalyst, comprising the reaction of an aqueous solution of a cyanide-free metal salt, an aqueous solution of a metal cyanide salt, an organic complex ligand, optionally a complex-forming component to form a dispersion, the dispersion being produced using a mixing nozzle and a peroxide. The invention further relates to double metal cyanide (DMC) catalysts obtainable by means of the method according to the invention and to the use of DMC catalysts to produce polyoxyalkylene polyols.

20 Claims, 3 Drawing Sheets

METHOD FOR PRODUCING DOUBLE METAL CYANIDE CATALYSTS

CROSS-REFERENCE TO RELATED APPLICATION

This application is a national stage application under 35 U.S.C. § 371 of PCT/EP2021/050404, filed Jan. 11, 2021, which claims the benefit of European Application No. 20152862.7, filed Jan. 21, 2020, which is incorporated herein by reference.

FIELD

The present invention relates to a process for preparing a double metal cyanide catalyst (DMC) comprising the reaction of an aqueous solution of a cyanide-free metal salt, an aqueous solution of a metal cyanide salt, an organic complex ligand, optionally a complex-forming component, to form a dispersion, wherein the dispersion is prepared in the presence of a mixing nozzle and a peroxide. The subject matter of the invention further encompasses double metal cyanide catalysts (DMC) obtainable in accordance with the process according to the invention and also the use of the DMC catalysts for the preparation of polyoxyalkylene polyols. Further provided are DMC catalysts which are obtainable via this process and also the use of the catalysts according to the invention for the preparation of polyoxyalkylene polyols.

BACKGROUND

DMC catalysts are known in principle from the prior art (see, for example, U.S. Pat. Nos. 3,404,109, 3,829,505, 3,941,849, and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and enable the preparation of polyether polyols at very low catalyst concentrations (25 ppm or lower), such that removal of the catalyst from the finished product is generally no longer required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

WO 01/39883 A1 discloses a process for preparing double metal cyanide (DMC) catalysts for the preparation of polyether polyols by polyaddition of alkylene oxides onto starter compounds having active hydrogen atoms, the DMC catalyst dispersion being prepared in this process using a mixing nozzle, preferably a jet disperser. The DMC catalysts thus prepared have increased activity in the preparation of polyether polyols, reduced particle size and a narrower particle size distribution.

WO 01/80994 A1 likewise discloses a process for preparing double metal cyanide catalysts (DMC), in which aqueous solutions of a metal salt and of a metal cyanide salt are first reacted in the presence of an organic complex ligand and optionally one or more further complex-forming components to form a DMC catalyst dispersion, this dispersion is then filtered, the filtercake is subsequently washed with one or more aqueous or nonaqueous solutions of the organic complex ligand and optionally one or more further complex-forming components by filtercake washing, and the washed filtercake is finally dried after an optional pressing out or mechanical moisture removal. The process disclosed shortens the time for catalyst preparation, the resulting catalysts possessing comparable activities in the preparation of polyether polyols in comparison to reference catalysts.

EP 700 949 A2 describes a DMC catalyst, containing DMC compound, an organic complex ligand and 5%-80% by weight of a polyether having a number-average molecular weight of >500 g/mol, the preparation of the DMC catalyst dispersion being effected at room temperature. The catalysts used generally possess an activity in the preparation of polyether polyols.

SUMMARY

The object of the present application was to provide an improved process for preparing double metal cyanide catalysts (DMC) having further increased catalytic activity in the preparation of polyoxyalkylene polyols, preferably polyether polyols and/or polyethercarbonate polyols, this improved activity resulting in a reduced product viscosity for example in the catalyst test according to the "8K diol stressed tests" described for example in WO 98/16310 A1. The aim was thus to provide catalytically more active DMC catalysts which lead to polyoxyalkylene polyols, preferably polyether polyols and/or polyethercarbonate polyols, having a reduced viscosity, which facilitates the further processability of the polyoxyalkylene polyols in the subsequent polyurethanization reaction. The increased catalyst activity moreover enables a reduction in the amount of catalyst used, which improves the industrial efficiency of the process.

A further object of the present invention was also that of reducing the proportion of high molecular weight by-products ("high molecular weight tail" (HMWT)) in the polyoxyalkylene polyol, since relatively high HMWTs can lead to problems such as foam disruptions or even foam collapse in the downstream processing to give flexible polyurethane foams.

Surprisingly, it has now been found that a process for preparing a double metal cyanide catalyst (DMC) comprising
i) reaction of an aqueous solution of a cyanide-free metal salt, an aqueous solution of a metal cyanide salt, an organic complex ligand, optionally a complex-forming component, to form a dispersion;
(ii) separation of the solid off from the dispersion obtained from (i);
(iii) washing of the isolated solid by means of redispersion or filtercake washing,
(iv) drying of the solid obtained,
wherein the reaction in step i) is effected using a mixing nozzle, wherein the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl oxetanemethanol, wherein double metal cyanide compounds of the formula (I) are present in the DMC catalyst $$M_x[M'_{x'}(CN)_y]_z \qquad (I),$$

where M is selected from one or more metal cations from the group consisting of Zn(II), Fe(II), Ni(II), Mn(II), Co(II), Sr(II), Sn(II), Pb(II) and Cu(II), preferably Zn(II), Fe(II), Co(II) and Ni(II), and M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V), preferably Co(III), Fe(III), Cr(III) and Ir(III), and x, x', y and z are integers and are selected such as to ensure the electronic neutrality of the double metal cyanide compound, preferably x=3, x'=1, y=6 and z=2, and wherein the reaction in step i) is effected in the presence of a peroxide, achieves the abovementioned object.

BRIEF DESCRIPTION OF THE DRAWINGS

Various features and characteristics of the inventions described in this specification may be better understood by reference to the accompanying figure, in which.

DETAILED DESCRIPTION

Figure 1:
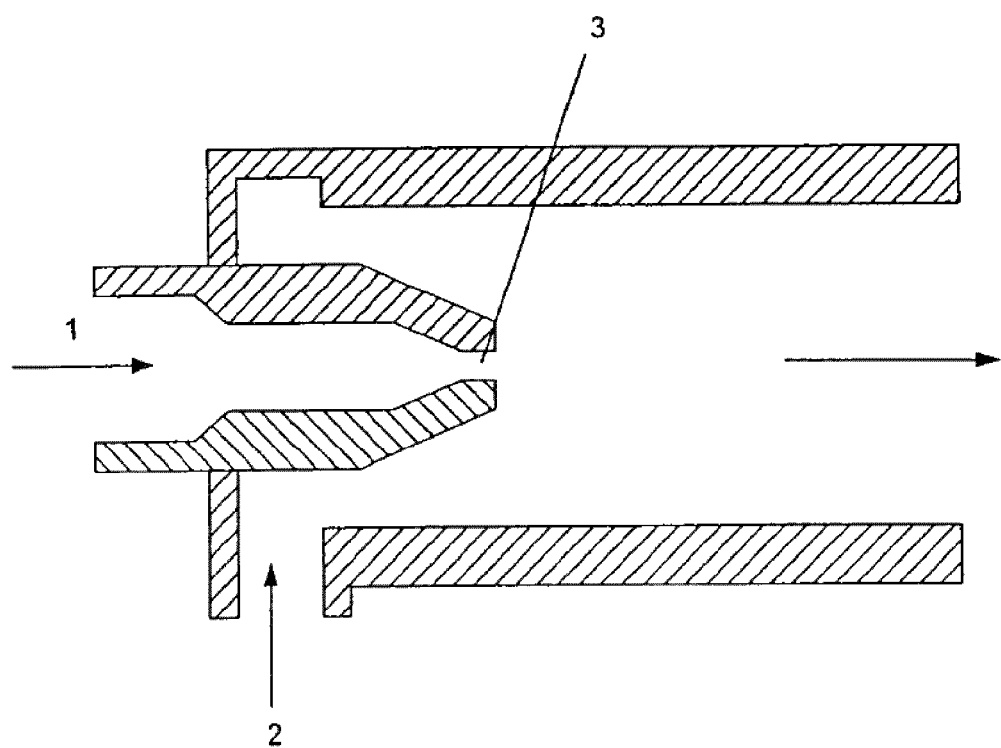
FIG. 1 shows the schematic structure of a simple smooth jet nozzle.

Cyanide-free metal salts suitable for preparation of the double metal cyanide compounds preferably have the general formula (II)

$$M(X)_n \tag{II}$$

where

M is selected from the metal cations Zn(II), Fe(II), Ni(II), Mn(II), Co(II), Sr(II), Sn(II), Pb(II) and Cu(II), preferably M is Zn(II), Fe(II), Co(II) or Ni(II), X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (III),

$$M_r(X)_3 \tag{III}$$

where

M is selected from the metal cations Fe(III), Al(III) and Cr(III),

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, cyanate, thiocyanate, isocyanate, isothiocyanate, carboxylate or nitrate, or suitable cyanide-free metal salts have the general formula (IV),

$$M(X)_s \tag{IV}$$

where

M is selected from the metal cations Mo(IV), V(IV) and W(IV),

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (V),

$$M(X)_t \tag{V}$$

where

M is selected from the metal cations Mo(VI) and W(VI),

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, cyanate, thiocyanate, isocyanate, isothiocyanate, carboxylate or nitrate.

In a preferred embodiment of the process according to the invention, the cyanide-free metal salt of the aqueous solution of a cyanide-free metal salt is one or more compound(s) and is selected from the group consisting of zinc chloride, zinc bromide, zinc iodide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate.

Metal cyanide salts suitable for preparation of the double metal cyanide compounds preferably have the general formula (VI)

$$(Y)_a M'(CN)_b (A)_c \tag{VI}$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. Li$^+$, Na$^+$, K$^+$, Rb$^+$, Cs$^+$) and alkaline earth metal (i.e. Be$^{2+}$, Ca$^{2+}$, Mg$^{2+}$, Sr$^{2+}$, Ba$^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, the values for a, b and c being selected such as to ensure the electronic neutrality of the metal cyanide salt; a is preferably 1, 2, 3 or 4; b is preferably 4, 5 or 6; c preferably has the value 0.

In a preferred embodiment of the process according to the invention, the metal cyanide salt of the aqueous solution of a metal cyanide salt is one or more compound(s) and is selected from the group consisting of potassium hexacyanocobaltate(III), potassium hexacyanoferrate(II), potassium hexacyanoferrate(III), calcium hexacyanocobaltate(III) and lithium hexacyanocobaltate(III).

In a preferred embodiment of the process according to the invention, the double metal cyanide compound is one or more compound(s) and is selected from the group consisting of zinc hexacyanocobaltate(III), zinc hexacyanoiridate(III), zinc hexacyanoferrate(III) and cobalt(II) hexacyanocobaltate(III). Particular preference is given to using zinc hexacyanocobaltate(III).

In the process according to the invention, the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, preferably tert-butanol.

In one embodiment of the process according to the invention, a complex-forming component is used.

The complex-forming component according to the invention can be selected from the compound classes of the polyethers, polyesters, polycarbonate s, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic esters of polyhydric alcohols, esters or amides, cyclodextrins and/or phosphorus compounds.

In the process according to the invention for preparing the DMC catalysts, as complex-forming component, polyethers are preferably used.

In a preferred embodiment, the polyether has a number-average molecular weight of ≥500 g/mol, the number-average molecular weight being calculated from the determined OH number.

OH numbers are determined according to the method of DIN 53240.

Suitable polyethers include those which are prepared by means of the ring-opening polymerization of cyclic ethers, these cyclic ethers for example also comprising oxetane polymers and also tetrahydrofuran polymers. Any form of catalysis is possible for this purpose. The polyether has suitable end groups here, such as for example hydroxyl, amine, ester or ether end groups.

In a particularly preferred embodiment, the polyether has an average hydroxyl functionality of from 2 to 8 and a number-average molecular weight in the range from 500 g/mol to 10 000 g/mol, preferably of from 700 g/mol to 5000 g/mol, the number-average molecular weight being calculated from the determined OH number.

In a particularly preferred embodiment, the polyethers are polyether polyols, the polyether polyols being obtained by reaction of alkylene oxides and H-functional starter compounds in the presence of acidic, basic and/or organometallic catalysts. These organometallic catalysts are for example double metal cyanide catalysts (DMC).

Suitable polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, such as for example poly(oxy)ethylene-poly(oxy)propylene block copolymers having terminal poly(oxy)ethylene blocks.

In a preferred embodiment, the polyether polyol is a poly(oxypropylene) polyol having a number-average molecular weight of ≥500 g/mol, the number-average molecular weight being calculated from the determined OH number.

In a particularly preferred embodiment, the polyether polyol is a poly(oxypropylene) polyol, preferably a poly(oxypropylene) diol and/or a poly(oxypropylene) triol having a number-average molecular weight of 700 g/mol to 4000 g/mol, the number-average molecular weight being calculated from the determined OH number.

In an alternative embodiment, the polyethers have an average hydroxyl functionality of from 2 to 8 and a number-average molecular weight in the range from 150 g/mol to less than 500 g/mol, preferably of from 200 g/mol to 400 g/mol, the number-average molecular weight being calculated from the determined OH number.

In a preferred alternative embodiment, the alternative polyethers are polyether polyols, these alternative polyether polyols having an average hydroxyl functionality of from 2 to 8 and a number-average molecular weight in the range from 150 g/mol to less than 500 g/mol, preferably an average hydroxyl functionality of from 2 to 8 and a number-average molecular weight in the range from 200 g/mol to 400 g/mol, the number-average molecular weight being calculated from the determined OH number. These alternative polyether polyols are likewise obtained by reaction of alkylene oxides and H-functional starter compounds in the presence of acidic, basic and/or organometallic catalysts. These organometallic catalysts are for example double metal cyanide catalysts (DMC).

Suitable alternative polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, such as for example poly(oxy)ethylene-poly(oxy)propylene block copolymers having terminal poly(oxy)ethylene blocks. Tripropylene glycol, triethylene glycol, tetrapropylene glycol, tetraethylene glycol, dipropylene glycol monomethyl ether, tripropylene glycol monomethyl ether, and monoalkyl and dialkyl ethers of glycols and poly(alkylene glycol)s are furthermore also suitable.

In a particularly preferred alternative embodiment, the alternative polyether polyol is a polypropylene glycol and/or a polyethylene glycol having a number-average molecular weight in the range from 150 g/mol to less than 500 g/mol, the number-average molecular weight being calculated from the determined OH number.

Peroxides are used in the process according to the invention. By the generally customary definition, this is understood to mean compounds that contain the peroxide anion ($O_2^{2-}$) or a peroxy group (—O—O—), where the oxygen in these compounds has a formal oxidation number of minus one.

The group of peroxidic compounds may be divided into inorganic and organic peroxides, where the inorganic peroxides often have salt-like character, whereas the organic peroxides bear covalently bonded peroxy groups. The oxygen-oxygen bond of peroxides is labile and tends to homolytic scission to form reactive free radicals.

In one embodiment of the process according to the invention, the peroxide is an inorganic peroxide.

In a preferred embodiment of the process according to the invention, the inorganic peroxide is in this case one or more compounds and is selected from the group consisting of hydrogen peroxide, peroxoborates, peroxocarbonates, peroxochlorates, peroxodiphosphates, peroxodiphosphoric acid, peroxodisulfuric acid, peroxodisulfates, peroxodisulfuryl difluoride, peroxohyponitrites, peroxocarbonic acid, peroxonitrates, peroxomolybdates, peroxomonophosphates, peroxomonophosphoric acid, peroxonitric acid, peroxomonosulfuric acid, peroxomonosulfates, peroxotungstates.

In an alternative embodiment of the process according to the invention, the peroxide is an organic peroxide, peresters and hydroperoxides being mentioned as examples.

In a preferred embodiment of the process according to the invention, the organic peroxide is one or more compounds and is selected from the group consisting of dibenzoyl peroxide, dilauroyl peroxide, acetylacetone peroxide, cyclohexanone peroxide, methyl ethyl ketone peroxide, methyl isobutyl ketone peroxide, cumene hydroperoxide, tert-butyl hydroperoxide, diisopropylbenzene hydroperoxide, di(2-tert-butylperoxyisopropyl)benzene, tert-butyl cumyl peroxide, di-tert-amyl peroxide, di-tert-butyl peroxide, dicumyl peroxide, 2,5-dimethyl-2,5-di(tert-butylperoxy)hexane, 1,1-di(tert-butylperoxy)-3,3,5-trimethylcyclohexane, 1,1-di(tert-butylperoxy)cyclohexane, 1,1-di(tert-amylperoxy)cyclohexane, 2,5-dimethyl-2,5-di(2-ethylhexanoylperoxy)hexane, 2,2-di(tert-butylperoxy)butane, tert-butyl peroxybenzoate, tert-butyl peroxy-3,5,5-trimethylhexanoate, tert-butyl peroxy-2-ethylhexanoate, tert-butyl monoperoxymaleate, di(4-tert-butylcyclohexyl) peroxydicarbonate, tert-butyl peroxy-2-ethylhexylcarbonate, tert-butyl peroxyisopropylcarbonate, 1,3 1,4-bis(tert-butylperoxyisopropyl) benzene, tert-butyl cumyl peroxide, 2,5-di(tert-butylperoxy)-2,5-dimethylhexane, n-butyl 4,4'-di(tert-butylperoxy) valerate, di(2,4-dichlorobenzoyl) peroxide, tert-butyl peroxybenzoate, butyl 4,4-di(tert-butylperoxy)valerate, 2,5-dimethyl-2,5-di(tert-butylperoxy)hex-3-yne, di-tert-butyl peroxide, tert-butyl peroxyacetate, tert-butyl peroxybenzoate, tert-butyl peroxyneodecanoate, tert-butyl peroxyisobutyrate, tert-amyl peroxypivalate, tert-butyl peroxypivalate, diisopropyl peroxydicarbonate, dicyclohexyl peroxydicarbonate and dicumyl peroxide.

In a particularly preferred embodiment of the process according to the invention, the organic peroxide is one or more compounds and is selected from the group consisting of tert-amyl peroxypivalate, tert-butyl peroxy-2-ethylhexanoate, tert-butyl peroxypivalate and dibenzoyl peroxide.

In one embodiment of the process according to the invention, the peroxide is used in a weight ratio of from 2:98 to 30:70, preferably from 5:95 to 20:80, based on the organic complex ligand.

The DMC catalyst dispersion is prepared in the process according to the invention using a mixing nozzle (for example a smooth jet nozzle, Levos nozzle, Bosch nozzle and the like), preferably a jet disperser, as is described in the patent application WO 01/39883 A1.

The basic structure and mode of operation of suitable mixing nozzles will be described hereinbelow. FIG. 1 shows the schematic structure of a simple smooth jet nozzle. The reactant stream 1 is first accelerated in the nozzle 3 and sprayed at a high flow speed into the slow-flowing reactant stream 2. In the process, reactant stream 2 is accelerated and reactant stream 1 is decelerated. Part of the kinetic energy of reactant jet 1 is converted into heat in this process and is thus no longer available for the mixing operation. The two reactant streams are subsequently mixed via the turbulent decay of the resulting jet into vortices of different sizes (vortex cascade). Compared to a stirred tank, concentration differences can be reduced much more rapidly in this way, as much greater and more homogeneous power densities can be achieved. The average power density P is calculated here by the following formula:

$$P = \frac{\Delta p \cdot \dot{V}}{V}$$

where: $\Delta p$: pressure drop in the nozzle
$\dot{V}$: volume flow rate
$V$: volume of the nozzle bore The use of such nozzles will be designated hereinbelow as method 1.

In a smooth jet nozzle, a first reactant stream is first accelerated in a nozzle and sprayed at a high flow speed into a slow-flowing second reactant stream. The two reactant streams are subsequently mixed via the turbulent decay of the resulting jet into vortices of different sizes (vortex cascade). Compared to a stirred tank, concentration differences can be reduced much more rapidly in this way, as much greater and more homogeneous power densities can be achieved.

Figure 2:
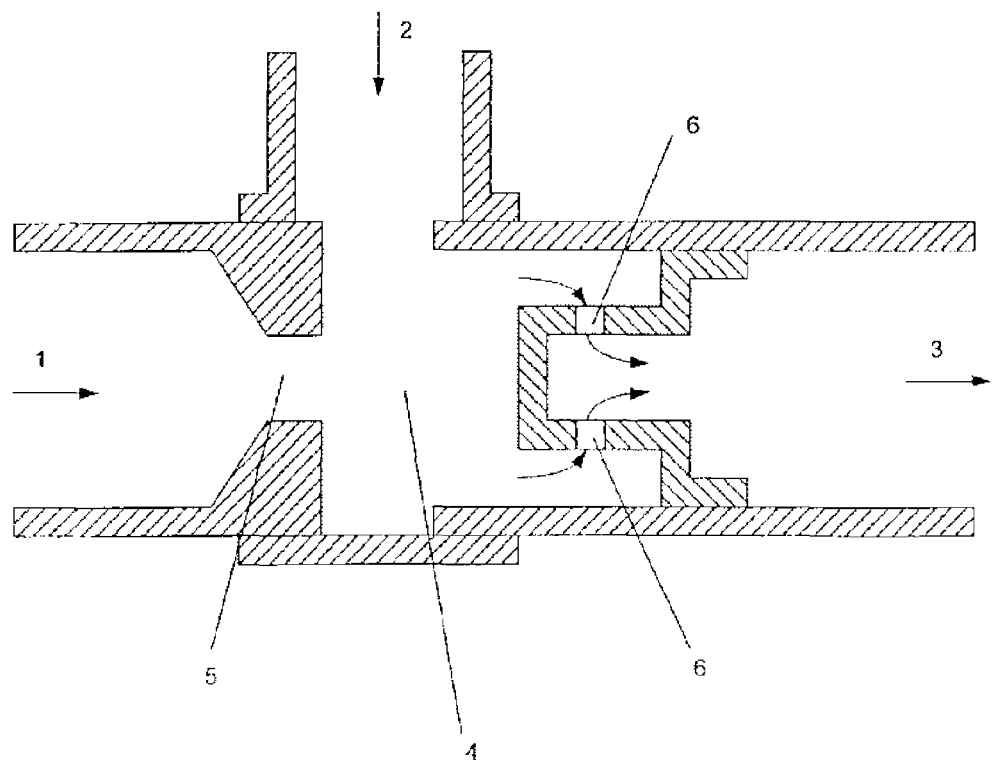
FIGS. 2 and 3 illustrate a jet disperser suitable for use in implementations of the inventions described in this specification.
Figure 3:
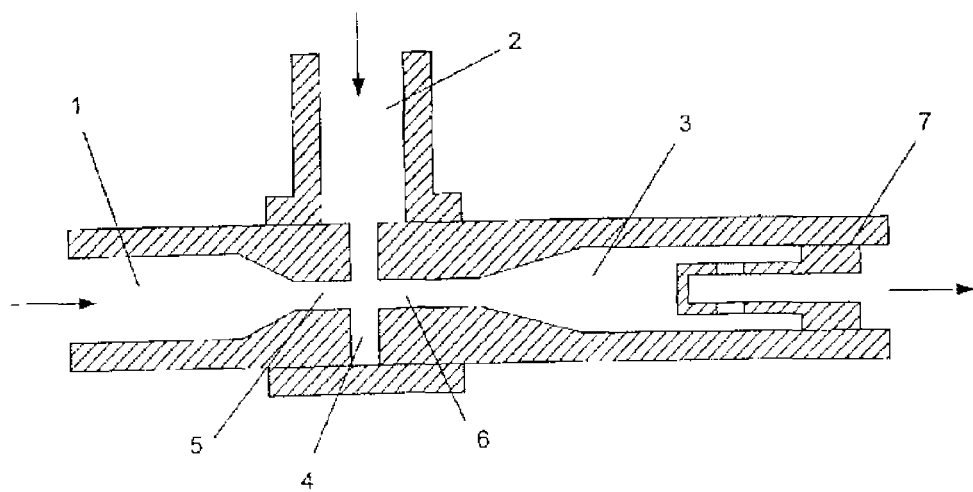

Preference is given to using a jet disperser as is illustrated in FIG. 2 or FIG. 3 for the process according to the invention. The jet disperser can be constructed (FIG. 2) such that two nozzles 5 and 6 are arranged in succession. The reactant stream 1 is first greatly accelerated in the nozzle 5 by the cross-sectional constriction. The accelerated jet in the process draws in the second component due to the high flow speed. The spacing of the nozzles is preferably selected so that only nucleation, but no crystal growth, occurs in the mixing chamber 4 on account of the short residence time. The decisive factor for the optimal design of the jet disperser is thus the nucleation rate of the solid. A residence time of 0.0001 s to 0.15 s, preferably 0.001 s to 0.1 s, is advantageously set. Crystal growth does not take place until in the outlet 3. The diameter of the nozzles 6 should preferably be selected so that the partially mixed reactant streams are accelerated further there. Due to the shear forces additionally arising as a result in the nozzles 6, compared to method 1, the state of homogeneous mixing is achieved in a shorter time because of a more rapid vortex decay. As a result, in contrast to method 1, it is possible even in the case of precipitation reactions with a very high nucleation rate to achieve the state of ideal mixing of the reactants, so that the setting of defined stoichiometric compositions during the precipitation reaction is possible. Nozzle diameters of from 5000 µm to 50 µm, preferably 2000 µm to 200 µm, have proven to be advantageous with pressure drops in the nozzle of 0.1 bar to 1000 bar or power densities in the range from $1*10^7$ W/m$^3$ to $1*10^{13}$ W/m$^3$. This mixing operation will be designated hereinbelow as method 2.

Depending on the desired particle size, a further n nozzles (with n=1-5) may be connected downstream so as to obtain a multistage jet disperser. FIG. 3 shows such a multistage jet disperser. Following the nozzle 6, the dispersion is once more guided through the nozzle 7. For the design of the nozzle diameter, the same applies as for nozzle 6.

The additional advantage of further dispersers compared to method 2 consists in that particles which have already formed can be mechanically comminuted by the large shear forces in the nozzles. In this way it is possible to produce particles having diameters of from 10 µm to 0.1 µm. Instead of a plurality of nozzles connected in series, comminution can also be achieved by circulating the dispersion. The use of such nozzles will be identified hereinbelow as method 3.

The energy dissipation in the nozzles and the enthalpy of crystallization can result in heating of the dispersion. Since the temperature can have a substantial influence on the crystal formation process, a heat transfer means may be installed downstream of the mixing element for the isothermal process regime.

A problem-free scale-up is for example possible by using a greater number of bores, connecting a plurality of mixing elements in parallel or enlarging the free nozzle area.

However, the latter is not achieved by increasing the nozzle diameter, as this gives rise to the possibility of the occurrence of a core flow which results in a deterioration in the mixing result. For nozzles having large free nozzle areas, it is therefore preferable to use slits having a corresponding area.

Figure 4:
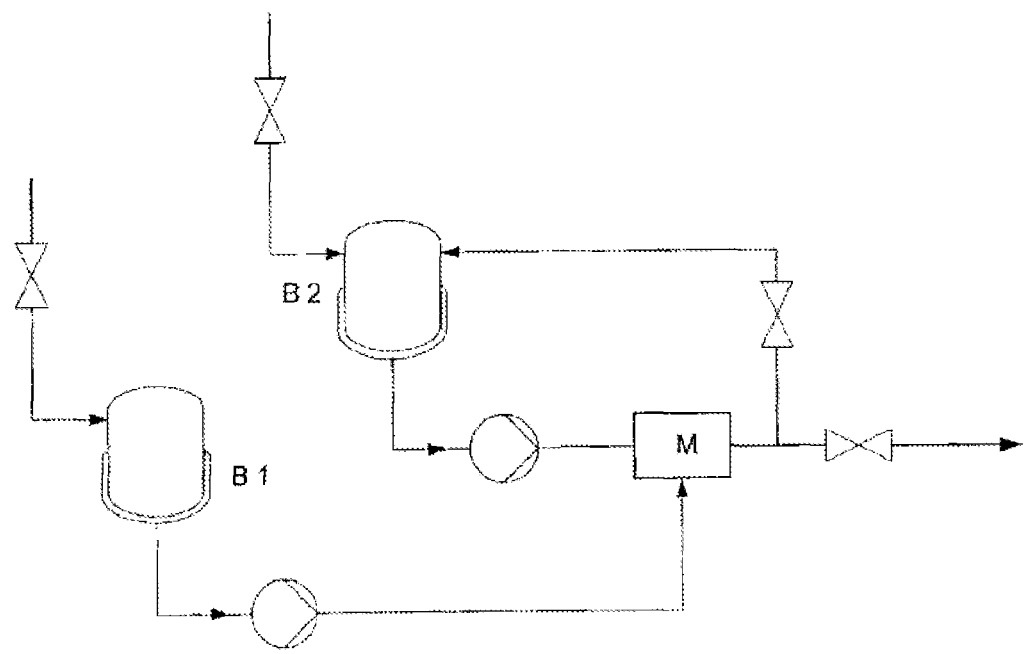
FIG. 4 illustrates preparation of a DMC catalyst dispersion in a semi-batchwise process using a jet disperser in combination with a loop reactor.
Figure 5:
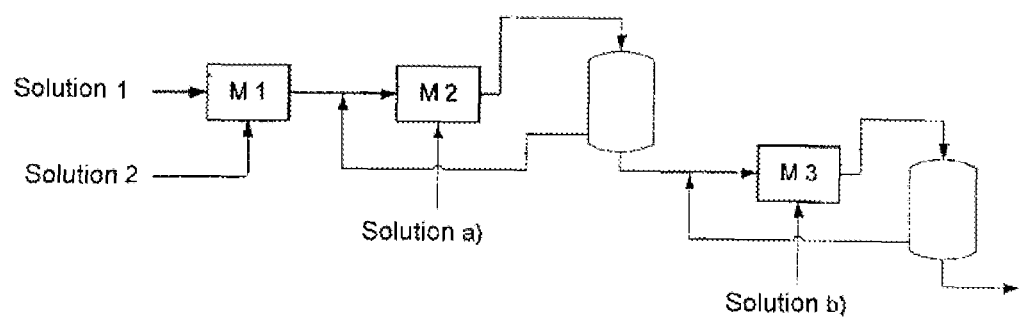
FIG. 5 illustrates preparation of a DMC catalyst dispersion in a continuous process.

The DMC catalyst dispersion is prepared in step i) according to the invention using a mixing nozzle, preferably a jet disperser. Examples of suitable apparatuses are shown in FIGS. 4 and 5. FIG. 4 shows a semi-batchwise process using a loop reactor, FIG. 5 shows a continuous process for preparing the DMC catalyst dispersion.

Through the use of a mixing nozzle, especially a jet disperser, the process for the preparation of the DMC catalyst dispersion can be effected with a comparably simple apparatus setup, a low energy expenditure for the shearing, good temperature control, and also a likewise good scalability compared to known industrial processes, in order to enable a simple implementation in existing DMC catalyst preparation processes, for example in loop reaction.

In one embodiment of the process according to the invention, the preparation of the double metal cyanide catalyst (DMC) according to the invention comprises
  i) in a first step, reaction of the aqueous solution of the invention of the cyanide-free metal salt, the aqueous solution of the invention of the metal cyanide salt, the organic complex ligand of the invention, optionally the complex-forming component of the invention, using the mixing nozzle of the invention, to form a dispersion;
    wherein the reaction is effected in the presence of a peroxide;
  (ii) in a second step, separation of the solid off from the dispersion obtained from (i);
  (iii) in a third step, washing of the isolated solid with an aqueous solution of an organic complex ligand by means of a filtercake washing operation;
  (iv) in a fourth step, drying of the solid obtained.

The aqueous solutions of the cyanide-free metal salt, for example zinc chloride, used in stoichiometric excess (at least 50 mol % based on the metal cyanide salt), and of the metal cyanide salt, for example potassium hexacyanocobaltate, are here preferably first reacted in the presence of the organic complex ligand, which may for example be tert-butanol, and in the presence of the peroxide, to form a dispersion. In the process according to the invention, this DMC catalyst dispersion is prepared using a mixing nozzle, preferably a jet disperser.

The preparation of the DMC catalyst dispersion in the semi-batchwise process using a jet disperser in combination with a loop reactor (as per FIG. 4) will be elucidated hereinbelow. In this case, either the aqueous solution of a cyanide-free metal salt can be circulated from the vessel B2 and the aqueous metal cyanide solution can be metered in from vessel B1, or vice versa. When both streams are combined in the mixing element M, a dispersion of the DMC compound is formed. The dispersion of the DMC compound can be prepared by method 1, 2 or 3, preferably by method 2 or 3. The advantage of these methods resides in the possibility of realizing a constant reactant ratio during the entire precipitation process.

Preferably, the dispersion formed after the precipitation is circulated through the jet disperser for an additional few minutes to several hours.

The nozzle diameters are in this case preferably between 2000 μm to 200 μm with pressure drops in the nozzle of between 0.1 bar to 1000 bar.

The organic complex ligand can in this case be present in the aqueous solution of the cyanide-free metal salt and/or of the metal cyanide salt, or it is metered directly into the dispersion obtained after precipitation of the double metal cyanide compound (via vessel B1 or B2).

The peroxide can in this case be present in the aqueous solution of the cyanide-free metal salt and/or of the metal cyanide salt, or it is metered directly into the dispersion obtained after precipitation of the double metal cyanide compound (via vessel B1 or B2).

In a preferred embodiment of the process according to the invention, the organic complex ligand and the peroxide are present in the aqueous solution of the cyanide-free metal salt.

Preferably, a further complex-forming component is subsequently metered via vessel B1 or B2 into the dispersion circulating through the jet disperser. The complex-forming component is preferably employed here in a mixture of water, the organic complex ligand and the peroxide.

The metered addition of the complex-forming component into the circuit and a subsequent recirculation preferably takes place under pressure drops in the nozzle of between 0.001 bar and 10 bar.

According to the invention, the DMC catalyst dispersion can also be prepared in a continuous process as is shown by way of example in FIG. 5. The aqueous solutions of the cyanide-free metal salt and of the metal cyanide salt are reacted according to method 1, 2 or 3 in the mixing element M1 to form a dispersion. The organic complex ligand and also the peroxide may be present here in the aqueous solution of the cyanide-free metal salt and/or of the metal cyanide salt. In this case, the mixing stage M2 is dispensed with in FIG. 5. It is also possible to add the organic complex ligand and the peroxide after the precipitation of the double metal cyanide compound via the mixing element M2. To increase the residence time of the dispersion, the latter can be circulated via the mixing element M2. The complex-forming component—preferably in a mixture of water, organic complex ligand and peroxide—can subsequently be added in the mixing element M3 and recirculated to increase the residence time.

In a preferred embodiment of the process according to the invention, the temperature in step i) is between 26° C. and 49° C., preferably between 28° C. and 47° C., particularly preferably between 29° C. and 42° C. and very particularly preferably between 30° C. and 40° C. Here, the process temperature corresponds to the process temperature in vessel B2 in FIG. 4. A process temperature of from 26° C. to 49° C. results in a further improvement in the activity of the DMC catalyst.

In the process according to the invention, in a second step (ii), the solid is separated off from the dispersion obtained from (i).

This involves isolating the solid (that is to say the precursor to the catalyst according to the invention) from the dispersion by known techniques, such as centrifugation or filtration.

Suitable filter apparatuses are described, for example, in "Ullmann's Encyclopedia of Industrial Chemistry", Vol. B 2, chapters 9 and 10, VCH, Weinheim, 1988 and H. Gasper, D. Oechsle, E. Pongratz (eds.): "Handbuch der industriellen Fest/Flüssig-Filtration" [Handbook of industrial solid-liquid filtration], Wiley-VCH Verlag GmbH, Weinheim, 2000.

The pressure gradient required for the filtration can be applied here by gravitational force, by centrifugal force (e.g. filter centrifuges), preferably by gas differential pressure (e.g. vacuum filter or pressure filter) or by liquid pressure (e.g. filter presses, drum or disk filters and also possibly crossflow filtration modules).

For removal of the catalysts, both batchwise and continuously operated filter apparatuses may be used. Examples of batchwise operating filter apparatuses are peeler centrifuges and inverting filter centrifuges, membrane, chamber, frame or tube filter presses, automatic filter presses, autopress devices, pressure plate, cartridge and plate filters and also vacuum and pressure suction filters. Examples of continuously operating filter apparatuses are belt filter presses, pressure and vacuum drum filters, pressure and vacuum disk filters, belt filters and crossflow filters.

For the filtration of the DMC catalyst dispersion, on the laboratory scale, vacuum or pressure filters or vacuum or pressure suction filters are particularly suitable; on the pilot plant and operational scale, pressure suction filters, filter presses and automatic filter presses are particularly suitable.

On the pilot plant scale, membrane filter presses have proven to be particularly suitable. These, with the aid of a suitable filter cloth, preferably a membrane cloth, enable the filtration of the DMC catalyst dispersion on the basis of an applied liquid pressure gradient.

The filtration is generally conducted at temperatures of from 10 to 80° C. The pressure differences applied may be 0.001 bar to 200 bar, preferably 0.1 bar to 100 bar, particularly preferably 0.1 bar to 25 bar, the pressure difference applied depending on the apparatus used.

In the process according to the invention, the isolated solid obtained in step (ii) is washed by means of redispersion or filtercake washing.

In a preferred embodiment of the process according to the invention, in a third step (iii), the isolated solid is washed with an aqueous solution of an organic complex ligand by means of a filtercake washing operation.

The filtercake washing is performed here preferably by slurrying or preferably by flow-through washing. Here, the washing liquid flows through the cake and the liquid previously present in the cake is displaced, with diffusion effects also becoming effective. The removal of moisture from the washed cake can be effected by gas differential pressure, centrifugal force or mechanical pressing, or preferably in a combined manner by removal of moisture by gas differential pressure followed by mechanical pressing out. The pressure for the mechanical pressing out can be applied in this case both mechanically and by membranes.

With the aid of the filtercake washing, the preparation process is simplified and hence also accelerated. The preferred ratio of washing liquid to filtercake volume lies at the amounts which bring about a complete exchange of the amount of liquid present in the original filtercake.

In an alternatively preferred embodiment variant of the process according to the invention, the isolated solid is subsequently washed in a third process step with an aqueous solution of the organic complex ligand (e.g. by redispersion and subsequent reisolation by filtration or centrifugation). This makes it possible to remove, for example, water-soluble by-products such as potassium chloride from the catalyst according to the invention. The amount of the organic complex ligand in the aqueous wash solution is preferably between 40% and 80% by weight, based on the overall solution.

Complex-forming component is optionally added to the aqueous wash solution in the third step, preferably in the range between 0.5% and 5% by weight, based on the overall solution.

Peroxide is optionally added to the aqueous wash solution in the third step, preferably in the range between 1% and 20% by weight, based on the overall solution.

It is also advantageous to wash the isolated solid more than once. Preferably, in a first wash step (iii-1), an aqueous solution of the organic complex ligand is used for washing (for example by redispersion and subsequent reisolation by filtration or centrifugation), in order in this way to remove, for example, water-soluble by-products such as potassium chloride from the catalyst according to the invention. It is particularly preferable when the amount of the organic complex ligand in the aqueous wash solution is between 40% and 80% by weight, based on the overall solution of the first wash step. In the further wash steps (iii-2), either the first wash step is repeated once or more than once, preferably once to three times, or preferably a nonaqueous solution, for example a mixture or solution of organic complex ligand and complex-forming component (preferably in the range between 0.5% and 5% by weight, based on the total amount of the wash solution of step (iii-2)) and/or peroxide (preferably in the range between 1% and 20% by weight, based on the total amount of the wash solution of step (iii-2)), is used as wash solution and the solid is washed with it once or more than once, preferably once to three times.

In the process according to the invention, in a fourth step (iv), the solid obtained is subsequently dried.

Here, the isolated and optionally washed solid is subsequently dried, optionally after pulverization, at temperatures of generally 20-100° C. and at pressures of generally 0.1 mbar to standard pressure (1013 mbar).

In a preferred embodiment of the process according to the invention, steps (ii) and (iii) are performed in a filter press.

It has proven to be advantageous to press out the washed filtercake after the filtercake washing at pressures of from 0.5 to 200 bar, preferably at the highest possible pressures. This can be done, for example, directly following the filtercake washing in a filter press or by means of other suitable pressing apparatuses which enable a mechanical pressure to be applied so that the liquid present in the filtercake can escape through a membrane or a suitable filter cloth. The mechanical removal of moisture from the filtercake, which follows the washing of the filtercake and is preferably to be carried out prior to the drying, can preferably take place in the filter press, preferably by mechanical pressing out via a pressure exerted onto the membranes. The mechanical removal of moisture preferably leads to a maximum removal of the washing liquid from the filtercake.

The DMC catalyst is subsequently dried at temperatures of about 20 to 100° C. and at pressures of about 0.1 mbar to standard pressure (1013 mbar). Contact dryers and convection dryers and also spray dryers are suitable for this. The drying is preferably also performed directly in the apparatuses for the mechanical removal of liquid, where these are suitable for this (e.g. suction dryer, centrifugal dryer, "hot filter press").

In a particularly preferred embodiment of the process according to the invention, steps (ii), (iii) and (iv) are performed in a heatable filter press.

The process preferably employs the heatable filter press. This is constructed as a conventional filter press with a membrane package. In terms of design, the membrane plates to be used differ from conventional membrane plates in that a heating medium can flow through the space behind the membrane. Liquid-tight (so-called "drip-" or "gas-tight") membrane filter plates are preferably used.

The heated heating medium flows past the filtercakes on the rear side of the press membranes, completely separated from the filtercake by the press membrane and the filter medium, and in the process heats the filtercakes. The pressing medium is in this case under a sufficiently high pressure to ensure contact of the membranes with the filtercakes. The filtercakes can be heated on one or both sides. Heating on both sides is favorable with regard to the drying time.

A vacuum is applied on the filtrate side to assist with the drying process. This vacuum can for example be generated by a liquid-ring pump. The vapor stream suctioned off is cooled upstream of the vacuum pump in order to condense out the volatile constituents (e.g. tert-butanol and water). Measured and controlled variables are the amount condensed out, the pressure in the filtrate system of the press and the filtercake temperature.

In the process described, the membrane pressing pressures are preferably 0.1 bar to 10 bar. Temperatures of the pressing and heating medium are 30° C. to 80° C., preferably 40° C. to 60° C. The filtrate-side pressure is preferably less than 100 mbar. The flow rate of the heating medium should be chosen to be sufficiently high that there is a good heat transfer between the heating medium and the product. Drying times are in general a few minutes to a plurality of hours, typically one to ten hours. Residual moisture contents of below the target value of approx. 5% are reliably achieved with this type of drying.

In further process steps, the product thus isolated and freed from secondary components can be ground and packaged.

The present invention further provides the DMC catalyst prepared by the process according to the invention.

The present invention further provides the use of the DMC catalysts prepared by the process according to the invention in a process for preparing polyoxyalkylene polyols, preferably polyether polyols by polyaddition of alkylene oxides onto starter compounds having active hydrogen atoms and/or polyethercarbonate polyols by polyaddition of alkylene oxides onto starter compounds having active hydrogen atoms in the presence of carbon dioxide.

The DMC catalysts prepared by the process according to the invention can by virtue of their extraordinarily high activity frequently be used in very low concentrations (25 ppm and less, based on the amount of the polyoxyalkylene polyol to be prepared, preferably the polyether polyol). If the polyoxyalkylene polyols, preferably polyether polyols, prepared in the presence of the DMC catalysts prepared by the process according to the invention are used to prepare polyurethanes, the removal of the catalyst from the polyoxyalkylene polyol, preferably polyether polyol, can be dispensed with without disadvantageously affecting the product qualities of the polyurethane obtained.

EXAMPLES

OH numbers were determined in accordance with the procedure of DIN 53240. Viscosities were determined by rotary viscometer (Physica MCR 51, manufacturer: Anton Paar) in accordance with the procedure of DIN 53018.

The high molecular weight by-products ("high molecular weight tail" (HMWT)) were determined in an analogous manner to the method described in U.S. Pat. No. 6,013,596.
Starting Materials Used:
tert-Amyl peroxypivalate (TAPP): Trigonox 125-C70 (Nouryon Chemicals)
tert-Butyl peroxy-2-ethylhexanoate (TBPEH): Luperox 26 (Arkema)

Preparation of the DMC Catalysts:

Example 1 (Comparative)

The catalyst was prepared using an apparatus as per FIG. 4.

In a loop reactor containing a jet disperser as per FIG. 2 having one bore (diameter 0.7 mm) was circulated a solution of 258 g of zinc chloride in 937 g of distilled water and 135 g of tert-butanol at 35° C. (determined in the vessel B2 in FIG. 4). To this was metered a solution of 26 g of potassium hexacyanocobaltate in 332 g of distilled water. The pressure drop in the jet disperser was 2.9 bar. Subsequently, the dispersion formed was circulated for 60 min at 35° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 35° C. with a pressure drop in the jet disperser of 2.9 bar.

230 g of the dispersion obtained were filtered in a pressure suction filter with filter area 20 cm$^3$, and then washed with a mixture of 82 g of tert-butanol, 42.3 g of distilled water and 1.7 g of polypropylene glycol 1000. The washed filtercake was squeezed mechanically between two strips of filter paper and finally dried for 3 h at room temperature under high vacuum at about 0.05 bar (absolute).

Example 2

The catalyst was prepared using an apparatus as per FIG. 4.

In a loop reactor containing a jet disperser as per FIG. 2 having one bore (diameter 0.7 mm) was circulated a solution of 258 g of zinc chloride in 937 g of distilled water, 135 g of tert-butanol and 13.5 g of tert-amyl peroxypivalate (TAPP) at 35° C. (determined in the vessel B2 in FIG. 4). To this was metered a solution of 26 g of potassium hexacyanocobaltate in 332 g of distilled water. The pressure drop in the jet disperser was 2.9 bar. Subsequently, the dispersion formed was circulated for 60 min at 35° C. with a pressure drop in the jet disperser of 2.9 bar. Thereafter, a mixture of 5.7 g of tert-butanol, 0.6 g of tert-amyl peroxypivalate (TAPP), 159 g of distilled water and 27.6 g of polypropylene glycol 1000 (PPG-1000) was metered in and the dispersion was then circulated for 80 min at 35° C. with a pressure drop in the jet disperser of 2.9 bar.

230 g of the dispersion obtained were filtered in a pressure suction filter with filter area 20 cm$^3$, and then washed with a mixture of 82 g of tert-butanol, 42.3 g of distilled water and 1.7 g of polypropylene glycol 1000. The washed filtercake was squeezed mechanically between two strips of filter paper and finally dried for 3 h at room temperature under high vacuum at about 0.05 bar (absolute).

Example 3

The catalyst was prepared using an apparatus as per FIG. 4.

In a loop reactor containing a jet disperser as per FIG. 2 having one bore (diameter 0.7 mm) was circulated a solution of 258 g of zinc chloride in 937 g of distilled water, 135 g of tert-butanol and 13.5 g of tert-butyl peroxy-2-ethylhexanoate (TBPEH) at 35° C. (determined in the vessel B2 in FIG. 4). To this was metered a solution of 26 g of potassium hexacyanocobaltate in 332 g of distilled water. The pressure drop in the jet disperser was 2.9 bar. Subsequently, the dispersion formed was circulated for 60 min at 35° C. with a pressure drop in the jet disperser of 2.9 bar. Thereafter, a mixture of 5.7 g of tert-butanol, 0.6 g of tert-butyl peroxy-2-ethylhexanoate (TBPEH), 159 g of distilled water and 27.6 g of polypropylene glycol 1000 (PPG-1000) was metered in and the dispersion was then circulated for 80 min at 35° C. with a pressure drop in the jet disperser of 2.9 bar. 230 g of the dispersion obtained were filtered in a pressure suction filter with filter area 20 cm³, and then washed with a mixture of 82 g of tert-butanol, 42.3 g of distilled water and 1.7 g of polypropylene glycol 1000. The washed filtercake was squeezed mechanically between two strips of filter paper and finally dried for 3 h at room temperature under high vacuum at about 0.05 bar (absolute).

Catalyst Test ("8K Diol Stressed Test"):

The DMC catalysts were tested in the so-called "8K diol stressed test". Here, a polypropylene glycol having a calculated OH number=14 mg KOH/g, that is to say molecular weight=8000 g/mol ("8K diol") was prepared proceeding from a bifunctional polypropylene glycol starter having an OH number=147 mg KOH/g ("Arcol Polyol 725" from Covestro) with a short propylene oxide metering time (30 minutes). The decisive evaluation criterion for the catalyst quality/activity in this test is the viscosity of the polyol obtained, with a DMC catalyst of increased quality/activity leading to a lower 8K diol viscosity.

General Implementation:

A 1 liter stainless steel reactor was initially charged with 75 g of a bifunctional polypropylene glycol starter (OH number=147 mg KOH/g) and 30.7 mg of DMC catalyst. After 5 cycles of nitrogen/vacuum exchange between 0.1 and 3.0 bar (absolute), the reactor contents were heated to 130° C. with stirring (800 rpm). The mixture was then stripped with nitrogen for 30 min at 130° C. and 100 mbar (absolute). 7.5 g of propylene oxide were then added at 130° C. and 100 mbar (absolute) to activate the catalyst. The catalyst activation manifested in an accelerated pressure drop in the reactor. After the catalyst had been activated, the remaining propylene oxide (685.7 g) was metered in within 30 min at 130° C. with stirring (800 rpm). After a post-reaction time of 30 min at 130° C., volatile constituents were distilled off under reduced pressure (<10 mbar) at 90° C. for 30 min. The product was then cooled down to room temperature and removed from the reactor.

The OH number and viscosity (25° C.) of the product obtained were measured. In the event of a deviation of the measured OH number from the calculated OH number (14 mg KOH/g), a "corrected viscosity" was determined from the measured viscosity using the following formula: corrected viscosity (25° C.)=measured viscosity (25° C.)+659*(OHN−14)

The results of the catalyst tests in the "8K diol stressed test" are summarized in table 1.

TABLE 1

| Catalyst test/Example | DMC catalyst/Example | Peroxide | OH number [mg KOH/g] | Viscosity 25° C./measured [mPas] | Viscosity 25° C./corrected [mPas] |
|---|---|---|---|---|---|
| 4 (comp.) | 1 (comp.) | — | 13.9 | 4975 | 4909 |
| 5 | 2 | TAPP | 14.3 | 4410 | 4608 |
| 6 | 3 | TBPEH | 14.3 | 4455 | 4653 |

The results show that DMC catalysts prepared in the presence of peroxides lead to lower viscosity values in the "8K diol stressed test".

Determination of "High Molecular Weight Tail":

The high molecular weight by-products ("high molecular weight tail") were additionally determined in the polyols from example 4 (comparative) and example 6 (table 2):

TABLE 2

| High molecular weight tail/Molar mass range [g/mol] | Polyol from example 4 (comparative) | Polyol from example 6 |
|---|---|---|
| 40000-50357 | 16547 | 15696 |
| 50358-63396 | 13927 | 13559 |
| 63397-79810 | 11996 | 11468 |
| 79811-100475 | 9583 | 8135 |
| 100476-126491 | 4987 | 3142 |
| 126492-159243 | 1813 | 981 |
| 159244-200475 | 604 | 265 |
| 200476-252383 | 207 | 84 |
| 252384-317731 | 76 | 28 |
| 317732-400000 | 30 | 10 |

The results show that the polyol from example 6, which had been obtained using a DMC catalyst of the invention prepared in the presence of a peroxide, contained a markedly reduced amount of "high molecular weight tail", especially in the molar mass range between 100 000 and 400 000 g/mol.

The invention claimed is:

1. A process for preparing a double metal cyanide (DMC) catalyst comprising:
   (i) reacting, in the presence of a peroxide, an aqueous solution of a cyanide-free metal salt, an aqueous solution of a metal cyanide salt, an organic complex ligand, and optionally a complex-forming component, to form a dispersion;
   (ii) separating a solid from the dispersion obtained from (i) thereby providing an isolated solid;
   (iii) washing the isolated solid by means of redispersion or filtercake washing to obtain a washed isolated solid, and
   (iv) drying the washed isolated solid to obtain the DMC catalyst,
   wherein the reaction in step i) is effected using a mixing nozzle,
   wherein the organic complex ligand comprises dimethoxyethane, tert-butanol, 2-methyl-3-buten-2-ol, 2-methyl-3-butyn-2-ol, ethylene glycol mono-tert-butyl ether 3-methyl-3-oxetanemethanol, or a mixture thereof, and
   wherein double metal cyanide compounds of the formula (I) are present in the DMC catalyst

$$M_x[M'_{x'}(CN)_y]_z \qquad (I),$$

where
   M comprises Zn(II), Fe(II), Ni(II), Mn(II), Co(II), Sr(II), Sn(II), Pb(II), Cu(II), or a mixture thereof and
   M' comprises Fe(II), Fe(III), Co(II), Co(III), Cr(II), Cr(III), Mn(II), Mn(III), Ir(III), Ni(II), Rh(III), Ru(II), V(IV), V(V), or a mixture thereof and
   x, x', y and z are integers and are selected such as to ensure the electronic neutrality of the double metal cyanide compound.

2. The process as claimed in claim 1, wherein the peroxide and the organic complex ligand are used in a weight ratio of from 2:98 to 30:70.

3. The process as claimed in claim 1, wherein the peroxide comprises an organic peroxide.

4. The process as claimed in claim 3, wherein the organic peroxide comprises dibenzoyl peroxide, dilauroyl peroxide, acetylacetone peroxide, cyclohexanone peroxide, methyl ethyl ketone peroxide, methyl isobutyl ketone peroxide, cumene hydroperoxide, tert-butyl hydroperoxide, diisopropylbenzene hydroperoxide, di(2-tert-butylperoxyisopropyl) benzene, tert-butyl cumyl peroxide, di-tert-amyl peroxide, di-tert-butyl peroxide, dicumyl peroxide, 2,5-dimethyl-2,5-di(tert-butylperoxy)hexane, 1,1-di(tert-butylperoxy)-3,3,5-trimethylcyclohexane, 1,1-di(tert-butylperoxy)cyclohexane, 1,1-di(tert-amylperoxy)cyclohexane, 2,5-dimethyl-2,5-di(2-ethylhexanoylperoxy)hexane, 2,2-di(tert-butylperoxy)butane, tert-butyl peroxybenzoate, tert-butyl peroxy-3,5,5-trimethylhexanoate, tert-butyl peroxy-2-ethylhexanoate, tert-butyl monoperoxymaleate, di(4-tert-butylcyclohexyl) peroxydicarbonate, tert-butyl peroxy-2-ethylhexylcarbonate, tert-butyl peroxyisopropylcarbonate, 1,3 1,4-bis(tert-butylperoxyisopropyl)benzene, tert-butyl cumyl peroxide, 2,5-di(tert-butylperoxy)-2,5-dimethylhexane, n-butyl 4,4'-di(tert-butylperoxy)valerate, di(2,4-dichlorobenzoyl) peroxide, tert-butyl peroxybenzoate, butyl 4,4-di(tert-butylperoxy)valerate, 2,5-dimethyl-2,5-di(tert-butylperoxy)hex-3-yne, di-tert-butyl peroxide, tert-butyl peroxyacetate, tert-butyl peroxybenzoate, tert-butyl peroxyneodecanoate, tert-butyl peroxyisobutyrate, tert-amyl peroxypivalate, tert-butyl peroxypivalate, diisopropyl peroxydicarbonate, dicyclohexyl peroxydicarbonate and dicumyl peroxide, or a mixture thereof.

5. The process as claimed in claim 4, wherein the organic peroxide comprises tert-amyl peroxypivalate, tert-butyl peroxy-2-ethylhexanoate, tert-butyl peroxypivalate, dibenzoyl peroxide, or a mixture thereof.

6. The process as claimed in claim 1, wherein the peroxide comprises an inorganic peroxide.

7. The process as claimed in claim 6, wherein the inorganic peroxide comprises hydrogen peroxide, a peroxoborate, a peroxocarbonate, a peroxochlorate, a peroxodiphosphate, peroxodiphosphoric acid, peroxodisulfuric acid, a peroxodisulfate, peroxodisulfuryl difluoride, a peroxohyponitrite, peroxocarbonic acid, a peroxonitrate, a peroxomolybdate, a peroxomonophosphate, peroxomonophosphoric acid, peroxonitric acid, peroxomonosulfuric acid, a peroxomonosulfate, a peroxotungstate, or a mixture thereof.

8. The process as claimed in claim 1, wherein a complex-forming component is used.

9. The process as claimed in claim 8, wherein the complex-forming component comprises a polyether.

10. The process as claimed in claim 1, wherein the double metal cyanide compound comprises zinc hexacyanocobaltate(III), zinc hexacyanoiridate(III), zinc hexacyanoferrate (III), cobalt(II) hexacyanocobaltate(III), or a mixture thereof.

11. The process as claimed in claim 1, wherein, in step (iii), the isolated solid is washed by means of filtercake washing with an aqueous solution of the organic complex ligand.

12. The process as claimed in claim 1, wherein the mixing nozzle comprises a jet disperser.

13. The process as claimed in claim 1, wherein the process temperature of the dispersion during the reaction in step i) is between 26° C. and 49° C.

14. A DMC catalyst obtained in accordance with claim 1.

15. A process of preparing a polyoxyalkylene polyol by polyaddition of an alkylene oxide onto a starter compound having active hydrogen atoms, wherein the polyaddition takes place in the presence of the DMC catalyst as claimed in claim 14.

16. The process of claim 1, wherein x=3, x'=1, y=6 and z=2.

17. The process of claim 1, wherein M comprises Zn(II), Fe(II), Co(II), Ni(II), or a mixture thereof, and M' comprises Co(III), Fe(III), Cr(III), Ir(III), or a mixture thereof.

18. The process of claim 2, wherein the peroxide and the organic complex ligand used in a weight ratio of from 5:95 to 20:80, based on the organic complex ligand.

19. The process as claimed in claim 9, wherein the polyether comprises a polyether polyol.

20. The process as claimed in claim 10, wherein the double metal cyanide compound comprises zinc hexacyanocobaltate(III).

* * * * *